United States Patent [19]

Trumbull

[11] Patent Number: 5,433,670
[45] Date of Patent: Jul. 18, 1995

[54] COMPACT SIMULATOR SYSTEM THEATER

[75] Inventor: Douglas Trumbull, Southfield, Mass.

[73] Assignee: Ridefilm Corporation, South Lee, Mass.

[21] Appl. No.: 14,330

[22] Filed: Feb. 5, 1993

[51] Int. Cl.⁶ .............................................. A63G 31/16
[52] U.S. Cl. ............................................ 472/60; 52/8;
352/85; 434/29; 472/59
[58] Field of Search ................ 52/6, 8, 9, 10; 472/59,
472/130, 60, 61; 434/29, 46, 50, 51, 58, 62, 55;
104/83, 85, 86; 352/48, 85, 132

[56] References Cited

U.S. PATENT DOCUMENTS

| | | | |
|---|---|---|---|
| 1,789,680 | 1/1931 | Gwinnett | 352/85 |
| 2,930,144 | 3/1960 | Fogarty | 434/58 |
| 3,542,934 | 11/1970 | Warhurst et al. | 472/60 |
| 3,577,655 | 5/1971 | Pancoe . | |
| 3,577,659 | 5/1971 | Kail . | |
| 4,251,140 | 2/1981 | Fogerty, Jr. | 352/85 |
| 4,343,610 | 8/1982 | Chou . | |
| 4,576,577 | 3/1986 | Lam et al. . | |
| 4,752,065 | 6/1988 | Trumbull et al. . | |
| 4,753,596 | 6/1988 | Hart et al. . | |
| 4,798,376 | 1/1989 | Trumbull et al. . | |
| 4,874,162 | 10/1989 | Trumbull et al. . | |
| 4,879,849 | 11/1989 | Hollingsworth, III et al. | 472/60 |
| 4,978,299 | 12/1990 | Denne . | |
| 5,018,973 | 5/1991 | Alet et al. . | |
| 5,071,352 | 12/1991 | Denne . | |
| 5,219,315 | 6/1993 | Fuller et al. | 434/58 |

FOREIGN PATENT DOCUMENTS 8302028  6/1983  WIPO ................ 472/130

Primary Examiner—Michael Safavi
Attorney, Agent, or Firm—McCormick, Paulding & Huber

[57] ABSTRACT

A compact theater for use with a simulator system includes a motion base moveable only along three mutually orthogonal displacement axes by means of displaceable actuators. A projector and screen are included for providing a sequence of audio signals and visual images to the occupants. A motion base controller generates actuator drive signals. A system controller provides the command signals to the motion base controller in synchronization with the presentation of the audio-visual images. The system controller generates the motion base command signals such that the displacement of the motion base is synchronized to the presentation of the audio signals and visual images. The motion base is characterized by a reduced height when fully retracted such that, when configured with the projector and screen, the total height is less than conventional simulators, enabling the present theater to be housed within buildings of a standard commercial height.

12 Claims, 7 Drawing Sheets

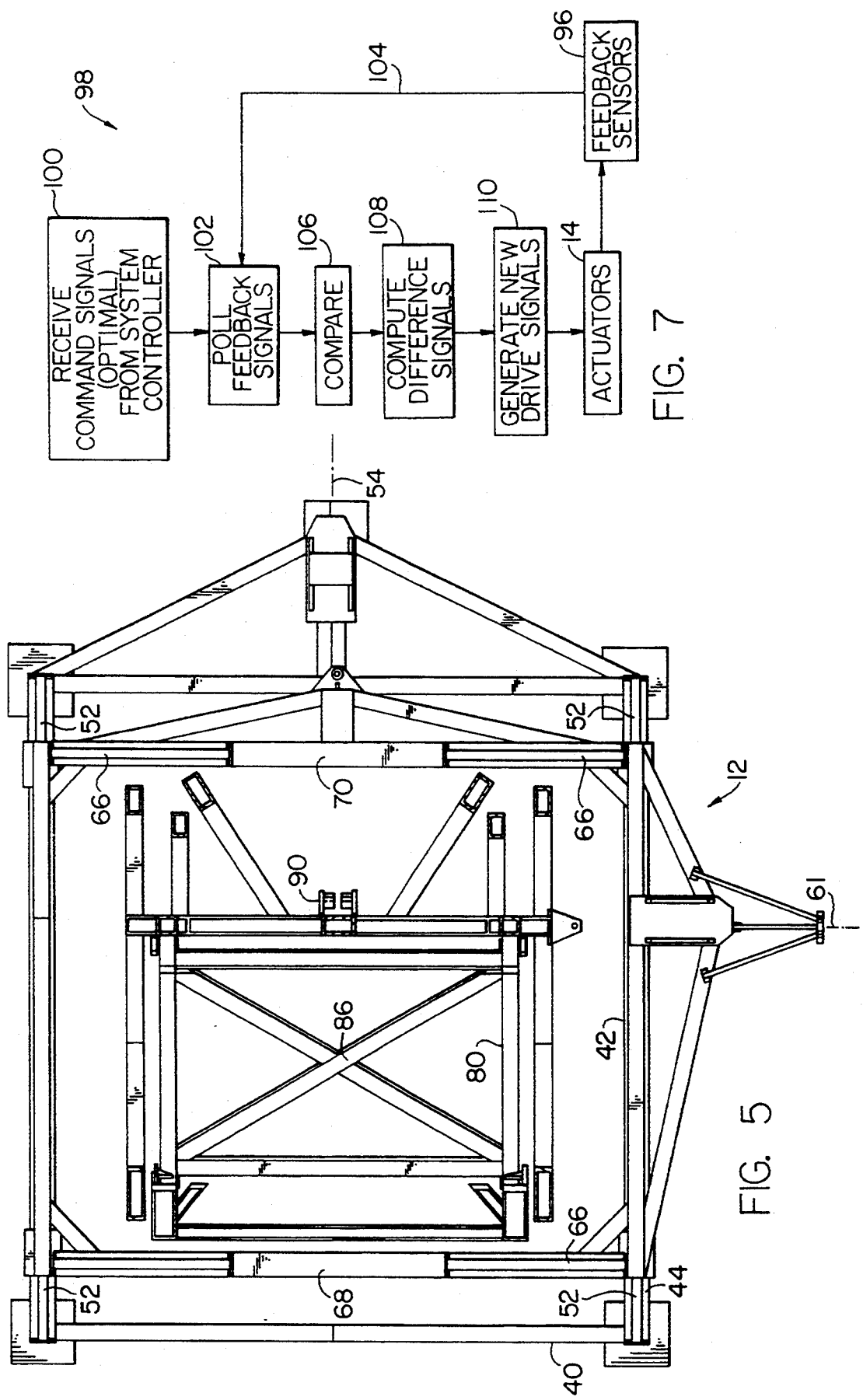

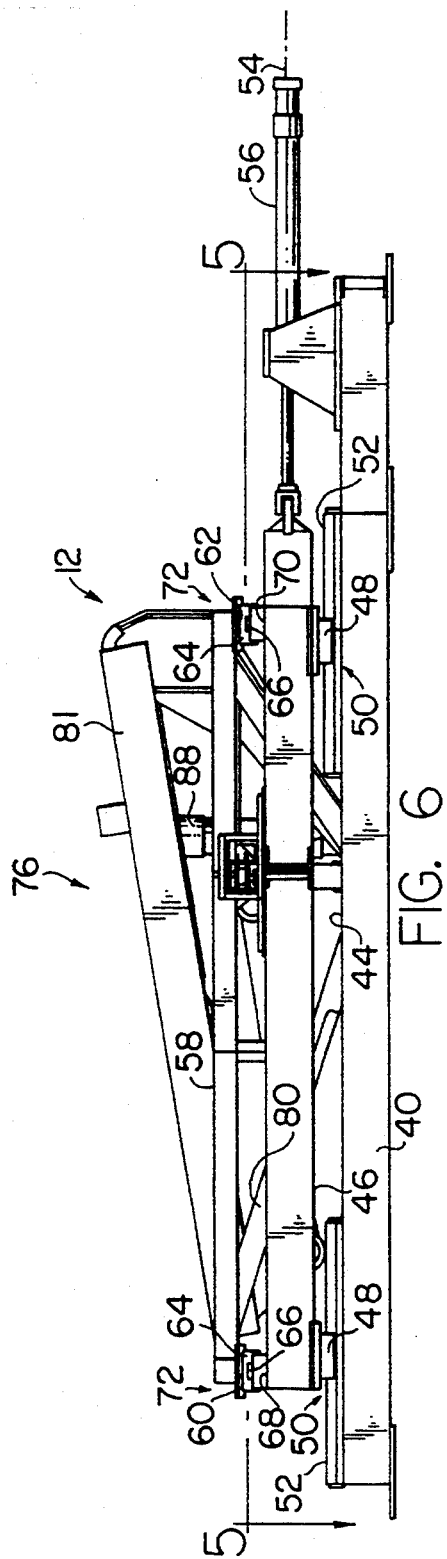

COMPACT SIMULATOR SYSTEM THEATER

TECHNICAL FIELD

The present invention relates to simulators generally and in particular to a theater housing a simulator system that is characterized by compact dimensions.

1. Cross Reference to Related Application

Some of the matter contained herein is disclosed and claimed in U.S. Pat. No. 5,199,875, entitled "A Method and Apparatus for Generating Supplemental Motion in a Simulator" and U.S. Pat. application Ser. No. 08/014,117, entitled "A Simulator System Having An Orthogonal Motion Base" both incorporated herein by reference.

2. Background of the Invention

Simulators are well known in the art having found applications in such diverse fields as aircraft pilot training and amusement rides. In general, known simulators include a motion base having one or more seats and a plurality of programmable actuators which displace the motion base from a rest position in accordance with a predetermined sequence of drive signals. Synchronized with the motion base movement is a motion picture illuminated on a projection screen directly attached to the motion base or in the immediate environment. A controller is sometimes included to provide for the synchronization between the motion base displacements and the accompanying audio-visual work. Alternatively, the audio-visual images and motion base control signals are simultaneously recorded in media if, for example, the resultant program is to be repeatedly used.

Known simulators include the amusement ride apparatus disclosed in U.S. Pat. Nos. 4,752,065 and 4,798,376, which includes a motion base that moves and tilts passengers viewing a motion picture. A plurality of passenger holding frames is provided which are all synchronously moved by separate sets of actuators. A film is shown to passengers on a stationary screen. The passenger holding frames are each pivoted up and down on a beam which is supported only by two largely vertical actuators while two pairs of links or arms limit the movement of the beam.

U.S. Pat. No. 3,923,300 and 3,865,430, to Tanus disclose a theater chair that comprises a support structure and a chassis having a back, arms and a seat moveably affixed to the chassis. There is a provision for movement in the vertical and horizontal directions. The Tanus chair comprises part of a overall system wherein control signal information is coded on motion picture film. The chair is operated synchronously with the playing of the motion picture to enhance the realism of the movie.

An example of a game machine is provided by U.S. Pat. No. 4,478,407, to Manabe. The '407 machine includes a motion base wherein a seat is pivotally mounted at perpendicular hinge points on a planar platform with motion in a perpendicular third dimension being accomplished by actuators configured therewith. The '407 device is designed to generate roll pitch and yaw sensations, as well as vertical movement.

A motion system for flight simulation is disclosed in U.S. Pat. 3,645,011, to Callanen. The '011 flight simulation system includes three spaced-apart hydraulic actuators for imparting translation to respectively associated reciprocal pistons. One of the actuators is positioned in a vertical plane containing the longitudinal or roll axis of a grounded flight trainer and the other two actuators are spaced from the roll axis at vertical positions on either side transverse to that axis.

Another amusement ride is disclosed in U.S. Pat. No. 4,066,256. The '256 amusement ride creates the illusion that the passengers are seated in a rapidly maneuvering vehicle by applying forces to the passengers in synchronism with the display of a motion picture image. The '256 apparatus includes a passenger holding frame that has three locations resting on hydraulic rams that can tilt the frame or move it up and down with a film projector and viewing screen connected to the frame to move with it.

U.S. Pat. No. 4,846,686, discloses a motor vehicle simulator with multiple images. The '686 simulator is characterized by a conventional front looking "driver point of view" image which would be seen by a driver looking through a windshield. Another section of the images displayed with the '686 simulator includes images that were recorded by one or more cameras which were facing rearward. An individual in the simulator is simultaneously presented with a forward looking "driver point of view" image and with other images representing what would be seen by the driver looking towards the rear of the simulator vehicle.

U.S. Pat. No. 4,276,030, discloses a pivotable vehicle simulator with one end of an upper frame carrying an occupant station of a simulated vehicle. The upper frame is mounted to a base frame which is pivotal about a vertical axis. A dummy steering wheel is provided at the occupant's station and is linked to pivot the upper frame. Combined rotary and translation bearings support the other end of the upper frame on a shaft carried on a base frame to accommodate the pivotal movement about the vertical axis and also to provide a small upward pitching of the upper frame during pivoting of the upper frame in either direction from a central position so that gravity acts to restore the upper frame and steering wheel to centered conditions.

Other known simulator systems rely primarily on rotational motion including the amusement apparatus of U.S. Pat. No. 5,060,932. the video simulation apparatus of U.S Pat. No. 4,856,771, and the simulation device of U.S. Pat. No. 4,710,129. All of the above are geared towards simulating simultaneous roll, yaw and pitch or combinations thereof. Some of the above are also configured to be used with projected images for viewing by occupants as part of the simulation. The amusement ride of U.S. Pat. No. 4,066,256, is characterized by three substantially vertical hinged actuators which are moved in a controlled manner to displace a suspended horizontal platform, thereby simulating acceleration in the plane of the platform.

With known simulators the movement imparted by the motion base has been correlated with the presentation of visual images without regard to the physiological effect on passengers of that combination of image and motion. An unanticipated and unwanted consequence has been the frequent inducement of motion sickness. It has been recognized that motion sickness stems primarily from an improper relationship between visual images and the corresponding motion of a person's reference frame.

Simulators deceive the mind through the use of a combination of visual images coupled with limited motion of the passengers. To be effective, simulators must rely on tricking the inner ear with initial movement of the motion base synchronized with the "onset queues"

presented as part of the visual image. The inner ear is sensitive to acceleration, i.e., the rate of change of velocity per unit time. The magnitude of acceleration is greatest at the onset of motion or at the onset of a change in motion. Consequently, it is most important for there to be strict correlation between the onset of the movement of the motion base and the corresponding visual image.

Angular motion of the frame of reference has been specifically demonstrated to be of great importance in causing motion sickness. For example, the driver of a car is least susceptible to motion sickness as compared to its passengers. Driver visual input is almost exclusively the view down the road towards the horizon. As such, the driver's frame of reference undergoes only orthogonal, rectilinear movement. In contrast, the passenger's frame of reference includes the other passengers as well as the vehicle's interior. The heaving and bobbing of that frame while driving is characterized by angular motion (e.g., roll, pitch and yaw).

Simulators, therefore, should correlate the physical and visual onset queues and avoid angular movement of that which comprises the passengers frame of reference, such as the vehicle interior. However, in the prior art there has been no recognition of the need to maintain orthogonal fidelity between motion and the visual images associated therewith or correlate onset queues. No prior art motion base is configured to constrain motion only in three orthogonal directions. In contrast, the prior art is unanimous in extolling the virtues of maximizing the degrees of freedom of the motion base and provide for rotational or angular motion of the vehicle, (roll, pitch and yaw) as they are directed at or derived from flight simulation and are constructed without regard to the relationship between onset queues.

Known motion bases must be adapted to emulate orthogonal motion, requiring additional complexity in the controller. The hardware needed to simulate rotational motion is superfluous if only three orthogonal degrees of freedom are mandated. The cost of these prior art motion bases are correspondingly excessive when movement is so limited.

Moreover, existing motion bases are large and tall, resulting in simulator systems that will not fit in buildings of a standard design. Commercial buildings typically have a maximum height of about 14.5 ft. Known simulator systems must, therefore, be housed in specially fabricated buildings. For amusement applications, new buildings must be constructed or existing buildings must be heavily modified, adding still more costs to the simulator system.

It would be desirable to have a simulator system which generates a more realistic simulation of an event in a simple and cost effective manner, capable of installation in standard buildings while avoiding movement that has the potential for inducing motion sickness. The present invention is drawn towards such a simulator system.

SUMMARY OF THE INVENTION

An object of the present invention is to provide a simulator system theater capable of enclosure within buildings of standard design.

Another object of the present invention is to provide a theater of the forgoing type that includes a motion base limited to three axes of movement.

Another object of the present invention is to provide a theater of the forgoing type that includes a motion base having a reduced height.

Still another aspect of the present invention is to provide a theater of the foregoing type whose passengers are each provided displacements of equal magnitude by the motion base.

According to the present invention, a simulator system theater for use in providing an event simulation to a plurality of occupants in a room of standard commercial height includes a motion base having a first member fixed to provide a foundation to the room floor; a second member adapted to be received by the first member to be moveable relative thereto only along a first axis; a third member adapted to be received by the second member to be moveable relative to the second member only along a second axis orthogonal to the first axis; a fourth member adapted to be received by the third member to be moveable relative to the third member only along a third, vertical axis orthogonal to both the first and second axes between a retracted height and an extended height as measured from the floor; a platform adapted to be received by the fourth member and having seats for the occupants. There is also a linear displacement apparatus including pairs of cooperatively engaging first and second linear guide elements affixed to adjacent ones of the members for constraining the members to linear movement relative to one another. A plurality of actuators is provided for effecting linear displacement of the members relative to one another in response to received actuator drive signals. An audio signal generator provides a sequence of audio signals to the theater occupants while a projector, including projection optics, presents visual images within a solid angle sector bounded by upper and lower planes. The projector is vertically separated from the motion base platform such that the motion base platform and the occupants in the seats do not substantially intersect the solid angle sector lower plane when the motion base is positioned at the extended height. Further, the sum of the motion base extended height and the projector separation is less than or equal to the commercial standard height of the room. A screen receives the projected visual images and reflects the same to the occupants. The screen includes a segment of a substantially spherical surface and has dimensions sufficient to intercept the solid angle sector upper and lower planes, thereby intercepting substantially all of the visual images. There is a motion base controller for generating the actuator drive signals in response to received command signals and a system controller for providing the command signals to the motion base controller in synchronization with the presentation of the audio signals and visual images.

BRIEF DESCRIPTION OF THE DRAWINGS

FIG. 5 is a section view of the motion base taken along line 5—5 of FIG. 4.

FIG. 6 is a simplified illustration of a side elevation view of the motion base of FIG. 4.

FIG. 7 is a diagrammatic illustration of an algorithm executed by the simulator system of FIG. 1.

DESCRIPTION OF THE PREFERRED EMBODIMENT

Figure 1:
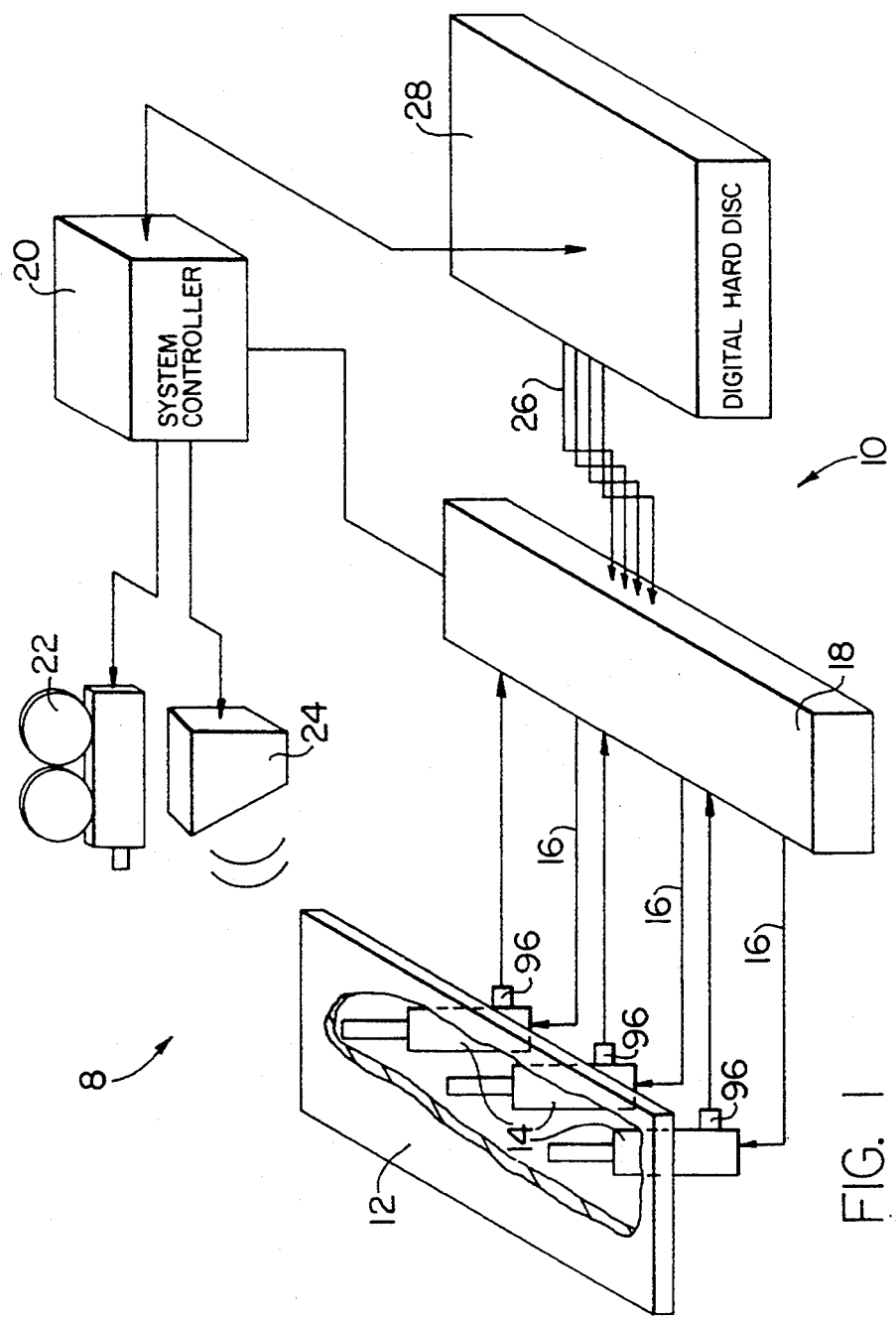
FIG. 1 is a simplified block diagram illustrating a simulator system included in a theater provided according to the present invention.

Referring now to FIG. 1 there is shown a block diagram illustrating a simulator system 8 included in a compact theater 10 provided according to the present invention. The theater 10 comprises a motion base 12 which includes a plurality of actuators 14. The actuators are of a known hydraulic type and receive drive signals on lines 16 from a motion base controller 18.

The theater includes a system controller 20 that provides control signals to projector 22 and speaker 24 as well as a viewing screen, not shown in the Figure. Audio signals and visual images are preferably encoded in a single film medium in a known manner. Command signals are provided on lines 26 from a storage medium such as a digital hard disc 28 to the motion base controller. The actuator drive signals are programmed and are configured to be synchronously applied to the motion base in accordance with the pre-programmed audio signals and visual images. As noted above, the motion base is preferably comprised of a plurality of hydraulic actuators, each of which is respectively configured with a servo valve (not shown) for receiving drive signals to displace the actuators a selected amount at a selected rate.

Figure 2:
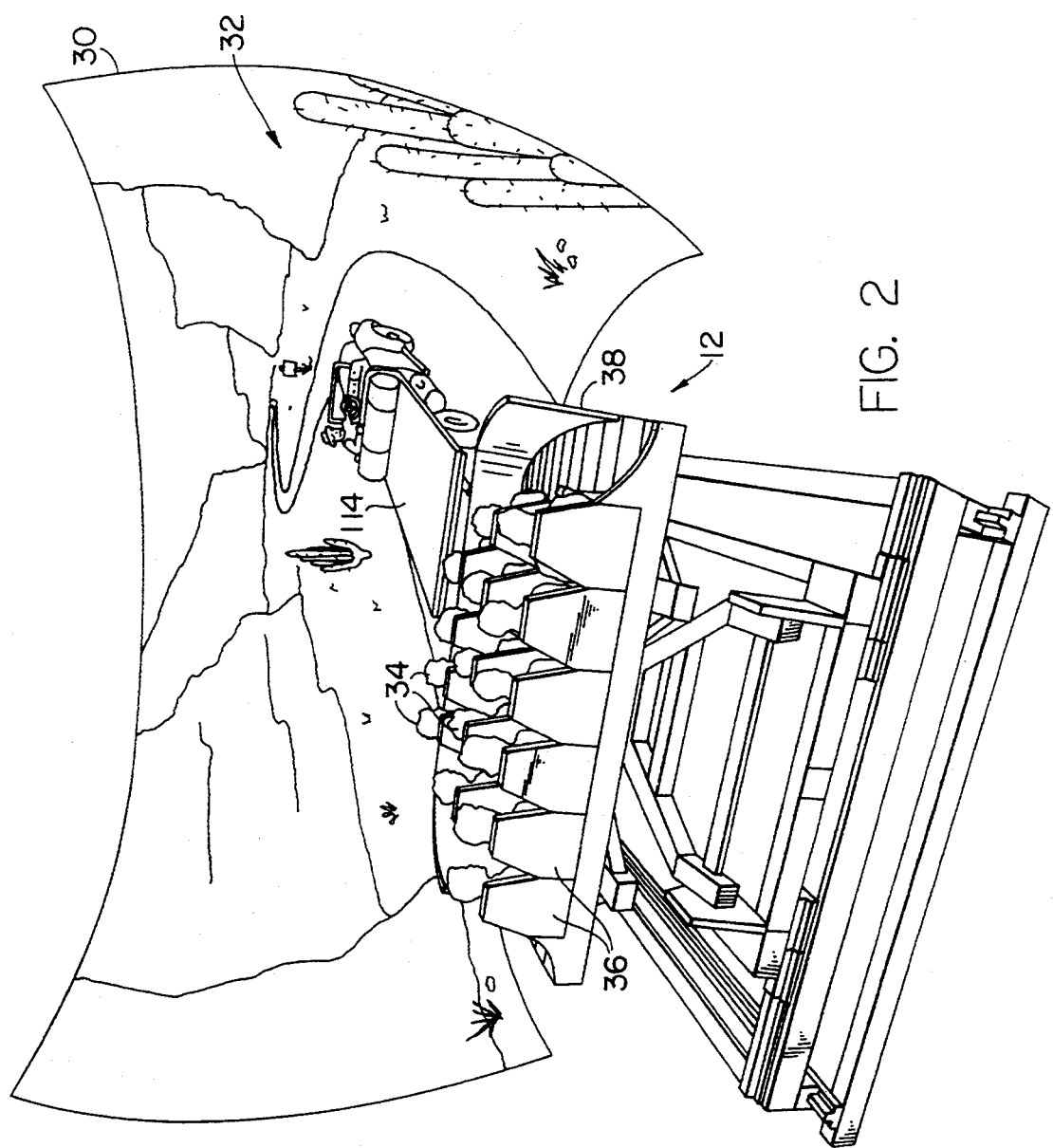
FIG. 2 is a simplified view in perspective of a portion of the theater of FIG. 1.
Figure 3:
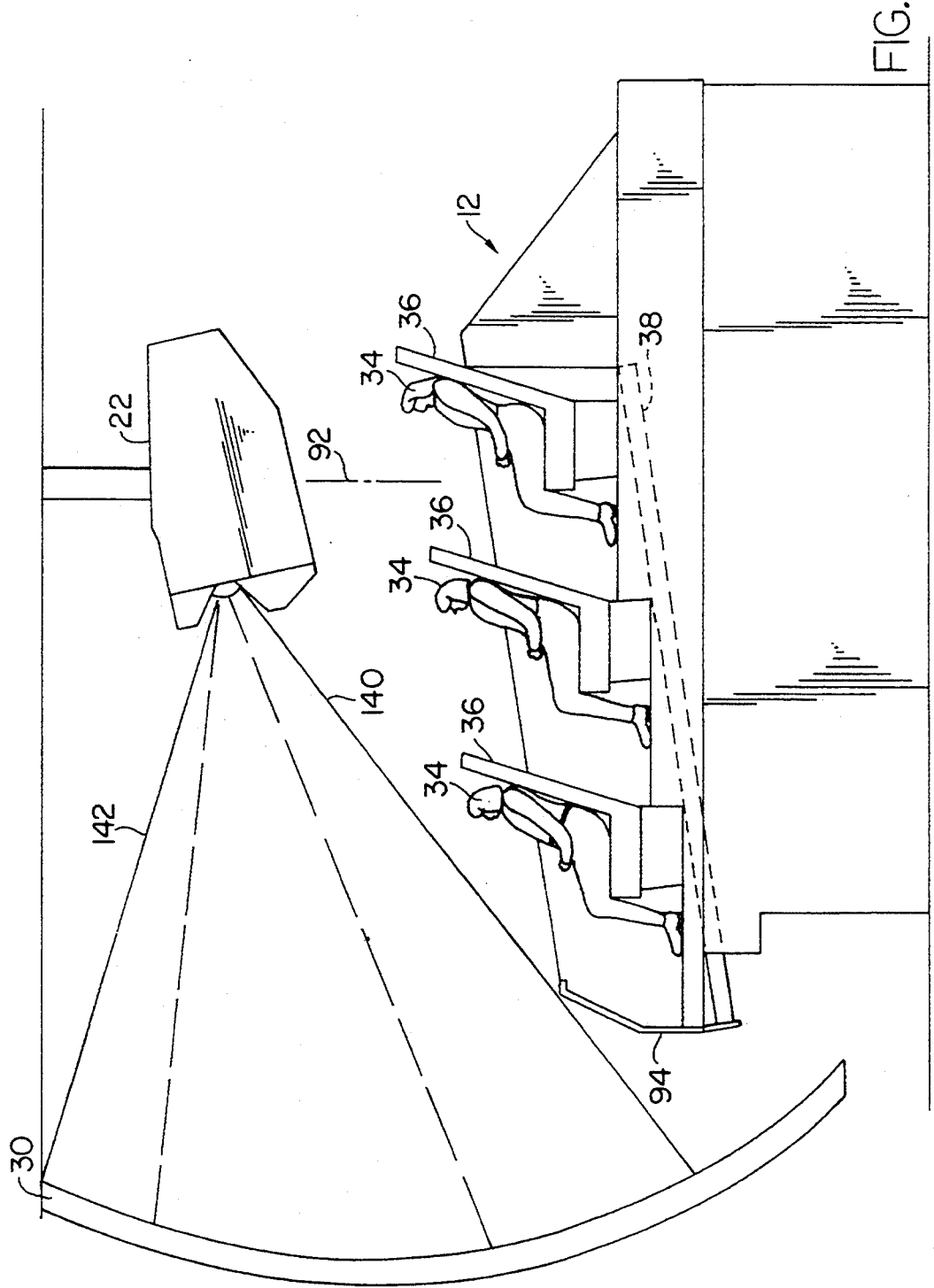
FIG. 3 is a simplified side elevational view of the theater of FIG. 1.

FIG. 2 is a simplified schematic illustration of a preferred embodiment of a portion of the theater 10, including the orthogonal motion base 12. On screen 30 is projected an image 32 projected in any conventional or rolling loop format. The screen is curved, with the preferred geometry being hemispherical. Passengers 34 are placed in seats 36 on a platform 38. The preferred system seats between 12 and 15 individuals. As shown in a side illustration of the motion base in FIG. 3, the platform is inclined towards the screen to afford each passenger an unobstructed view. Also shown in FIG. 3 is the projector 22 positioned above the motion base. Other parameters of the preferred screen and projector combination are detailed herein.

Figure 4:
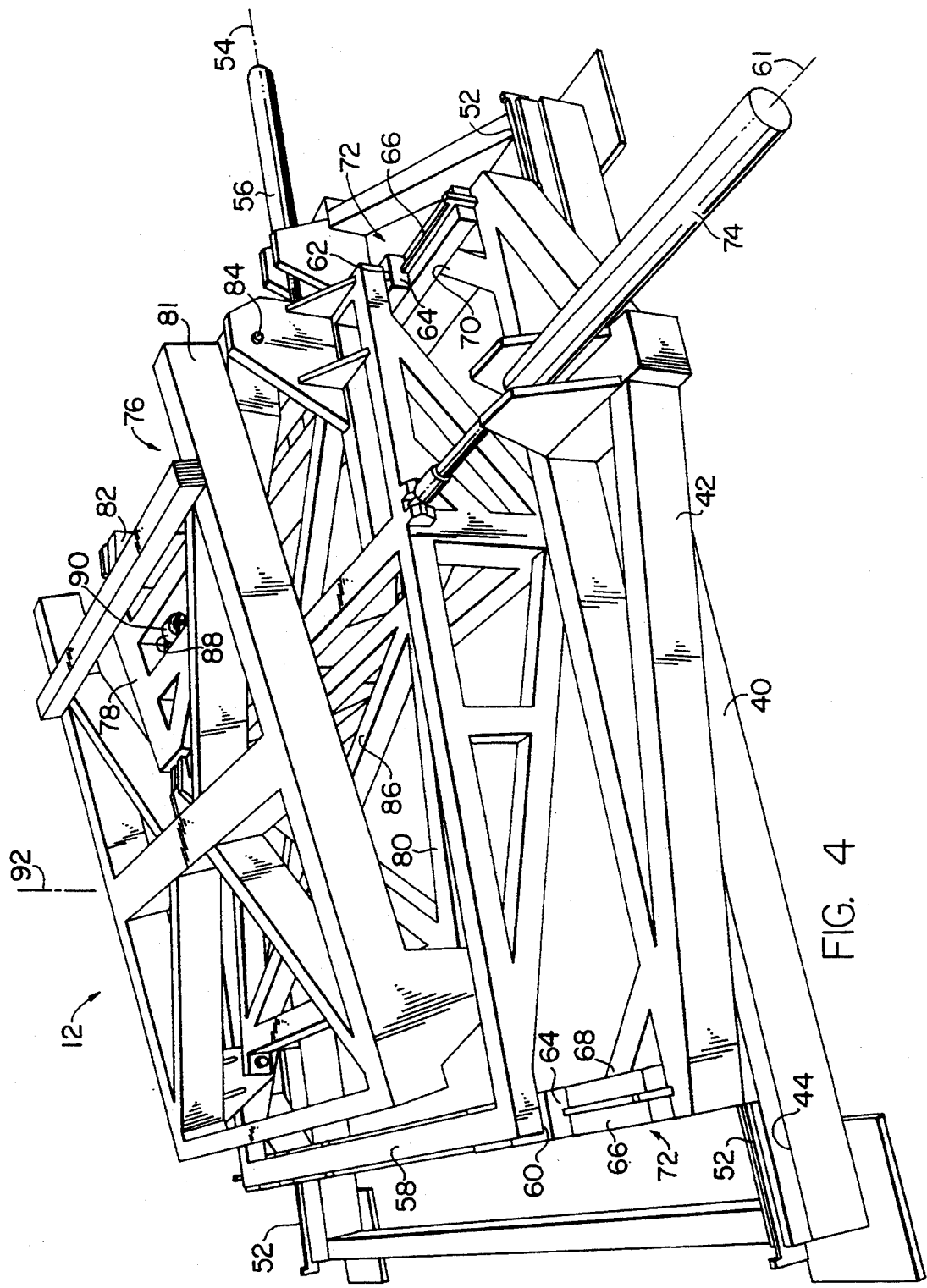
FIG. 4 is a perspective view of the motion base included in the simulator system of FIG. 1.

FIGS. 4-6 illustrate the assembly of the motion base 12 both in perspective and plan. A base frame 40 acts as a foundation for the motion base and is affixed to the floor or other immovable portion of the simulator system. A middle carriage 42 is located on a base frame upper surface 44. Along a bottom surface 46 of the middle carriage is a first member 48 of a first displacement mechanism 50 which comprises rails or tracks of a known design. A second member 52 cooperative with first member 48 is affixed to the upper surface 44 of the base frame. The middle carriage is configured to be moveable only along axis 54 by means of actuator 56.

Atop the middle carriage is an upper carriage 58 having bottom surfaces 60, 62 respectively having members 64. Cooperative rails 66 are affixed to respective upper surfaces 68, 70 of the middle carriage. Members 64 and rails 66 together comprise a second displacement mechanism 72 that constrains the upper carriage to movement only along a second axis 60 perpendicular to axis 54. Actuator 74 provides force needed to move the upper carriage as desired. Although the displacement mechanisms are shown to be cooperative rails, those skilled in the art will note that other, equivalent means may be substituted including track or rack and pinion mechanisms. Similarly, other means of actuation, such as electromagnetic motors or pneumatic cylinders may be substituted with appropriate conventional modification to the system's hardware and software.

A motion platform 76, received by the upper carriage, is preferably tilted at an angle whose magnitude is in concert with a theater seat configuration. The motion platform comprises a lift arm 78 and stabilizer 80 that are pivotably mounted to a passenger frame 81 to form a parallelogram. The lift arm is "Y" shaped and is pivotably mounted to the upper carriage at hinge points 82, 84. The stabilizer is preferably a perimeter frame structure with a cross brace 86. The passenger frame receives the passenger platform. Provision is made on the passenger platform 38 for receiving seats as well as a barrier 94 and any auxiliary equipment. The barrier insures the safety of the occupants as well as truncating any passenger view of the motion base platform.

Actuator 88 is received at lift arm apex 90. In the preferred embodiment, the actuator 88 is mounted vertically and urges the lift arm upward at the apex. The lift arm is configured with the stabilizer to limit the motion of the passenger platform 38 along a vertical axis 92.

The preferred motion base is characterized by a reduced overall height as compared to the prior art and by orthogonal motion in the plane containing the upper and middle carriages, with substantially vertical motion (i.e. less than 10 degrees rotation) in the third direction. The motion base 12 has a retracted height which is much lower than conventional designs while retaining the extension needed for effective simulation. The inclusion of a reduced height motion base enables the present theater to be located within building constructed to a conventional ceiling height of about 14.5 ft., and marks a point of departure of the present invention over the prior art. Those skilled in the art will note that other motion base configurations are encompassed by the present invention, including embodiments wherein the passenger platform is moved vertically by a rail or rack and pinion mechanism or by a cantilever mechanism in which the overall height is reduced as above.

The motion base of the preferred embodiment is simple and light-weight to reduce construction and maintenance costs. The motion base members are configured to move only along a respective single axis such that rotational motions along a yaw, pitch and roll rotational axes are almost completely avoided. Without rotational motion, the present motion base obviates the need for universal joints, hinges, swivel couplings and the like which are needed to accomplish complex angular positions as provided by conventional motion bases. The present motion base is limited almost entirely to only three degrees of freedom, the classic x, y and z orthogonal axes.

The motion base controller is preferably a proportional/integral/derivative (PID) type controller as is marketed by the Allen Bradley Corporation. The motion base controller generates actuator drive signals in response to command signals received from either the system controller or an external source such as a hard disc recorder 28 in the preferred embodiment. The motion base is preferably operated in closed loop fashion, with each actuator having a sensor 96 for generating feedback signals corresponding to the measured actuator displacement. These feedback signals are used by the motion base controller to insure a maximum error between the commanded position of the actuator and its actual displacement is not exceeded during operation.

For a given set of audio signals and visual images in the preferred embodiment, a corresponding sequence of command signals must be generated for the motion base controller in repetitive programming situations, such as in an amusement ride. Typically the command signals for the motion base controller are programmed using an Anitech motion controller manufactured by the Anitech Corporation. This controller comprises algorithms which allow for manual selection of individual actuator displacements synchronized with corresponding segments of the motion picture. In addition, algorithms such as executed by PCFX software provided by the Persistence of Vision Company, Culver City, Calif. are used to provide for specific desired transient responses of the motion base. The PCFX program or its equivalent provides for enhanced editing capabilities as well as command signal generation utilities for sine wave generation, actuator displacement smoothing and key frame splicing.

The motion base must have each programmed actuator position synchronized with the audio-visual images being presented to the occupants at a particular time. Synchronization can be accomplished in any of a number of ways. In the preferred embodiment, the SMPTE time code is provided to the system controller from the motion picture and is provided to controller software such as is available from the above referenced Anitech Corporation and auxiliary control apparatus such as a Studio 3 sequence and a Macintosh brand computer or equivalent. Software associated with the system controller synchronizes the command signals with the associated motion picture frame(s). The synchronized command signals are then preferably stored in the digital hard disc. The system controller also comprises software of a known type to enable synchronized playback of the command signals with the presentation of the motion picture to the occupants of the simulator system. For example, minimum acceleration is achieved when the command signal sequence is selected to approximate a Gaussian function. Similarly, other mathematical algorithms can be used to generate maximum acceleration. In the theater 10 this is accomplished using the PCFX program noted above. The speed of displacement of the actuator is programmed in view of the motion base controller cutoff frequency.

FIG. 7 illustrates a simplified algorithm 98 executed by the present invention. Regardless of what kind of motion base controller provides the drive signals, one channel of drive signal voltage is provided to a servo valve on each axis which controls the amount of hydraulic pressure exerted by each actuator. These drive signals correspond to optimal actuator displacements as determined by the command signals (block 100). At periodic sample points, commonly four per frame or 192 per second in the present theater operated at 48 frames per second, the motion base controller polls (block 102) the associated feedback signal 104 from feedback sensors 96 to determine the current displacement of that actuator. These signals are then compared to the commanded actuator displacement signals at block 106 and a difference is calculated (block 108). The result is either positive or negative and the actuator is then either extended or compressed in an effort to make the calculated error zero in response to new drive signals (block 110).

A further advantage of the present invention results from the simplification in the control system needed to operate the motion base. The algorithms needed to generate the three axis movement as described herein are necessarily more complicated with motion base systems with four or more degrees of freedom. The combination of less complex (and bulky) hardware and operational software yields a substantial savings in overall theater costs.

With the present theater, visual onset queues can be limited to the linear, orthogonal motion that characterizes the preferred motion base. Prior art motion bases violate this requirement, resulting in a lack of correlation between the visual and physical onset queues at the risk of inducing motion sickness. The present theater, therefore, avoids angular motion of that which constitutes all or some of the frame of reference of the passengers. In some embodiments of the present invention the passengers frame of reference is established by the vehicle (e.g., auto or boat) in which the passengers are supposedly transported. Such embodiments would include a motion base as detailed above along with the vehicle interior surrounding the passengers. The movement of the interior of the car or prow of the boat would be automatically restricted to exclusively orthogonal motion since the interior is fixed to the motion base. The visual images presented in conjunction with the movements of the motion base are unrestricted, and include angular motion, linear orthogonal motion and/or combinations thereof.

However, that which comprises the frame of reference of the passengers or occupants can include a portion of the visual image presented on the screen. In general, the visual image can be divided into an image sub-portion which comprises part of the passengers frame of reference and the remainder image. This feature of the present invention marks an important departure from the prior art.

The present orthogonal motion base may also be scaled in size without effecting the magnitude of the displacement each passenger experiences. This feature is a direct result of the linear orthogonal motion to which the present motion base is constrained. In contrast, prior art simulators have an upper bound on size, and hence the number of passengers. This constraint stems from the fact that angular motion is allowed.

Angular motion entails rotations, usually about an axis and rarely about a point. Regardless, as the linear distance from the pivot increases, so does the magnitude of displacement and acceleration on the passengers. Consequently, those at or immediately about the pivot will have a reduced experience, while those furthest removed may be so displaced as to be quite uncomfortable. The only acceptable solution in the prior art is to limit the size of the simulator accordingly.

Figure 8:
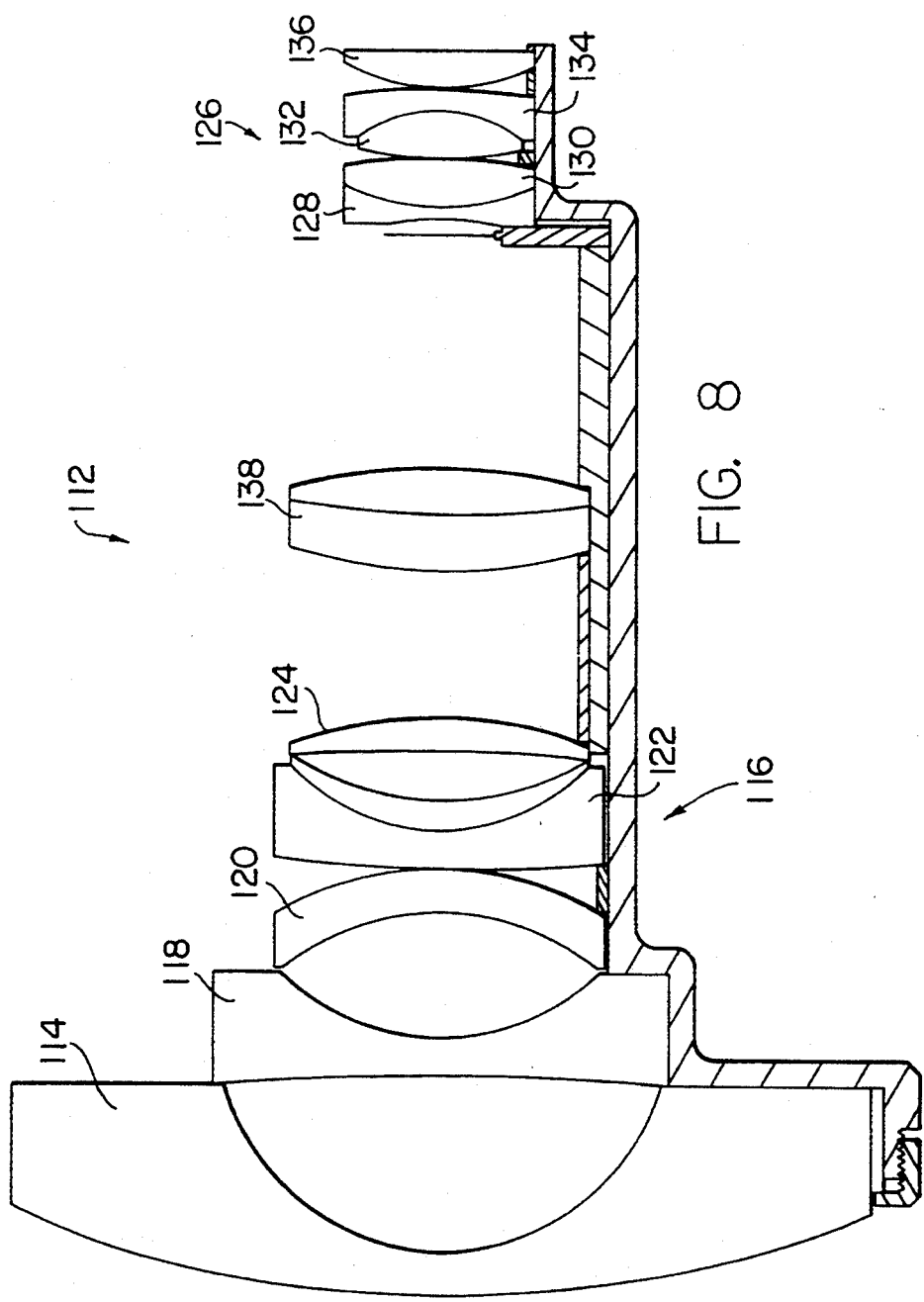
FIG. 8 is a sectioned, schematic illustration of a portion of projection optics employed by the theater of FIG. 2.

The projector 22 is comprised of projection optics, a portion of which are shown in section in FIG. 8. The projection optics 112 preferably includes a "fisheye" wide angle lens 114 having a focal length of 14.8 millimeters to provide 180 degrees horizontal coverage with an aperture of F/2 or, for some applications, F/4. Collating optics 116 are also included and are comprised of lenses 118, 120, 122 and 124. A light gathering optical train 126 comprised of lenses 128, 130, 132, 134, 136 as well as field lens 138 are also provided.

The projector itself is located in a self contained blimped pod which can be hung from a ceiling or attached to a wall with an appropriate bracket. The projector is preferably tilted to 2 degrees down from the horizontal and includes a 4K Xenon lamp providing 28 ft. Lamberts of light as measured at the center of the screen at the preferred frame rate of 48 frames per second without film in the gate. In the theater of FIG. 1, the projection aperture is 1.435 in. horizontal and 0.636 in. vertical with a full aperture of 1.485 in. horizontal and 0.991 in. vertical, with a full aperture of 1.485 in. horizontal and 0.991 in. vertical. Vistavision with 8 perforations per frame (8 perf) 35 mm film is the preferred film format.

The projector optical train is mounted with its horizontal center line downward 3/16 of an in. relative to the horizontal center line of the film in the gate and is tilted about the forward nodal plane approximately 1 degree down. The vertical center of the nodal plane is 13 ft. 2 in. above the floor in the embodiment shown in the Drawing, with the horizontal center of the nodal plane 5 in. in front of the screen hemisphere plane.

The preferred screen has an interior radius of 12.5 ft., resulting in an interior diameter therefore of 25 ft. and exterior diameter of 26 ft. The equator location of the screen is 10 ft., 9 in. above the floor with a total vertical height of about 14.5 ft. Since the bottom plane of the screen is approximately 2 ft. above the floor, the preferred screen has a ft. cord height of 12.5 ft. The center of the image is 9 ft., 2 in. above the floor and the screen has a coating with a gain of plus 3. The center seat eye level vertical height is 8 ft. 4 in. above the ground and the center seat eye level horizontal position is 5 in. behind the screen hemisphere plane such that the center seat location is rearwardly displaced from the exit of the projection optics.

A theater provided in accordance with the present invention is characterized by compact dimensions, especially the total height needed to enclose the projector as well as the screen. As noted above, conventional buildings are constructed to have a certain standard conventional height of approximately 14.5 ft. Known motion bases require buildings whose vertical extent is much greater due to the combination of the projection optics as well as the space requirements of the motion base.

A motion base provided in accordance with the present invention is characterized by a retracted height which is far lower than those of known motion bases due, in part, to the limitation of the number of degrees of freedom it affords. The throw of the present motion base has not been compromised by the dimensions of the room in which the simulator system is enclosed and the full range of motion needed to accomplish the desired simulation is displayed by the motion base.

The present theater is further characterized by projection optics located in the projector which are particularly suited to the reduced ceiling height. The wide angle lens used in the present invention defines two surfaces 140, 142 as upper and lower bounds for the image. In the present invention the upper surface intersects the screen at its most vertical extent near the ceiling while the lower surface intersects the screen at a line displaced below the horizon of the occupants but which is not substantially intersected by the occupants themselves nor motion base componentry, such as the barrier. In the preferred embodiment, the motion base platform is inclined towards the screen by a conventional amount.

Those skilled in the art will note that the position of the projector relative to the screen and the motion base has been optimized to minimize both the vertical dimensions as well as its lateral extent, shown in FIG. 3 as extending from left to right. Positioning of the projector further rearward of the motion base would be of no benefit, since a simple displacement would result in the illumination of the occupants as they would now intersect the lower boundary plane. In order to maintain the same visual image integrity, the projector would have to be moved upwardly towards (and through) the ceiling. Movement of the projector forward towards the screen substantially from its preferred would result in the projector entering the field of view of at least some of the occupants, greatly lessening the experience.

Similarly, although the invention has been shown and described with respect to a preferred embodiment thereof, it would be understood by those skilled in the art that other various changes, omissions and additions thereto may be made without departing from the spirit and scope of the present invention.

I claim:

1. A simulator system theater for providing an event simulation to a plurality of occupants thereof in a room of standard commercial height of approximately 14.5 feet, said simulator system theater comprising:
   a three axis orthogonal motion base having
   a base member fixed to provide a foundation to the room floor said base member having a base member interface surface;
   a lower member received by said base member interface surface along a cooperative first lower member interface surface to be moveable relative thereto in a first axis;
   cooperatively engaging base and lower displacement guide elements respectively affixed to said base member interface surface and said first lower member interface surface for constraining said base and lower members to linear relative movement along said first axis;
   first actuator means communicating with said base and lower displacement guide elements for effecting displacement of said base and lower members relative to one another in response to received first actuator drive signals;
   a middle member received by a second lower member interface surface along a cooperative first middle member interface surface to be moveable relative to said lower member along a second axis orthogonal to said first axis;
   cooperatively engaging lower and middle displacement guide elements respectively affixed to said second lower member interface surface and said first middle member interface surface for constraining said lower and middle members to linear relative movement along said second axis;
   second actuator means communicating with said lower and middle displacement guide elements for effecting displacement of said lower and middle members relative to one another in response to received second actuator drive signals;
   a platform having seats for said occupants and received by a second middle member interface surface along a cooperative first platform interface surface to be moveable relative to said middle member along a third, vertical axis orthogonal to both said first and second axes between a retracted height and an extended height as measured from said floor;
   a third actuator means communicating with said middle and platform displacement guide elements for effecting displacement of said middle member relative to said platform in response to received third actuator drive signals;

an audio display means for providing a sequence of audio signals to the simulator system occupant;

a projector means including projection optics for presenting visual images within a solid angle sector bounded by upper and lower planes, said projection means vertically separated from said motion base platform such that said motion base platform and said occupants in said seats do not intersect said sold angle sector lower plane when said motion base is positioned at said extended height, the sum of said motion base extended height and said projection means separation being less than or equal to approximately 14.5 feet;

a screen spaced from said motion base and said projection means for receiving said projected visual images and reflecting said visual images to said occupants in focus, said screen including a segment of a spherical surface anti having dimensions sufficient to intercept said solid angle sector upper and lower planes, thereby intercepting all of said visual images;

a motion base controller for generating said actuator drive signals in response to received command signals; and a system controller for providing said command signals to said motion base controller in synchronization with the presentation of said audio signals and said visual images.

2. The theater of claim 1 wherein:

said base member further comprises a frame with an upper frame surface;

said lower member further comprises a frame adapted to be received by said base member along said base member upper frame surface and having an inner surface bounding a lower member interior cavity, said lower member to be linearly moveable relative to said base member in said base member only along a lower frame member axis; and said middle member further comprising a frame adapted to be received by said lower member along said lower member interior cavity surface to be linearly moveable relative to said lower member only in a second axis orthogonal to said first axis substantially parallel to a middle frame member axis.

3. The theater of claim 1 wherein said lower and middle member frames further comprise respective inner surfaces bounding an interior cavity and wherein said platform is vertically moveable and is adapted to be received within said interior cavity.

4. The theater of claim 1 wherein said actuator means comprise hydraulic actuators.

5. The theater of claim 1 wherein said displacement means further comprise cooperative rack and pinion means.

6. The theater of claim 1 wherein said motion base controller further comprises a proportional-integral-derivative (PID) controller.

7. The theater of claim 1 further comprising feedback sensors configured with each of said actuator means for providing, to said motion base controller, signals indicative of the measured actuator means displacement.

8. The theater of claim 1 wherein said visual images further comprise visual image subset signals to be received by said occupant corresponding to a subset of said visual images, said controller further comprises a means to constrain said visual image subset signals to move only along said three orthogonal axes and a means for synchronizing the presentation of said actuator drive signals with said visual image subset signals and with the remainder of said visual images and said audio signals.

9. The theater of claim 1 wherein said projection optics further comprise a fisheye projection lens.

10. The theater of claim 9 wherein said fisheye lens has a focal length of approximately 14 mm.

11. The theater of claim 1 wherein said screen intersects said solid angle sector upper plane about 14.5 ft. from said floor.

12. The theater of claim 1 wherein said platform includes a center seat and wherein said projection optics are in approximate registration thereabove fixed relative to said motion base platform.

* * * * *